No. 660,909. Patented Oct. 30, 1900.
B. G. LAMME.
ELECTRIC MOTOR.
(Application filed Sept. 14, 1899.)

(No Model.)

WITNESSES:
Ethan D Dodds
H. C. Tener

INVENTOR
Benjamin G. Lamme
BY
Wesley G. Carr
ATTORNEY.

THE NORRIS PETERS CO., PHOTO-LITHO., WASHINGTON, D. C.

UNITED STATES PATENT OFFICE.

BENJAMIN G. LAMME, OF PITTSBURG, PENNSYLVANIA, ASSIGNOR TO THE WESTINGHOUSE ELECTRIC AND MANUFACTURING COMPANY, OF PENNSYLVANIA.

ELECTRIC MOTOR.

SPECIFICATION forming part of Letters Patent No. 660,909, dated October 30, 1900.

Application filed September 14, 1899. Serial No. 730,431. (No model.)

*To all whom it may concern:*

Be it known that I, BENJAMIN G. LAMME, a citizen of the United States, residing at Pittsburg, in the county of Allegheny and State of Pennsylvania, have invented a new and useful Improvement in Electric Motors, (Case No. 846,) of which the following is a specification.

My invention relates to electric motors, and particularly to that class known as "polyphase induction-motors," in which the propelling electrical energy is supplied to only one of the members, the other member being provided with electric circuits closed upon themselves, in which currents are induced by the rotating magnetic field set up by the current supplied to the primary member.

The object of my invention is to provide a motor of the class indicated with a plurality of windings so constructed and arranged as to produce rotating magnetic fields having different numbers of poles in order to secure different rates of speed and to so dispose the primary windings as to reduce to a minimum the losses due to local magnetic circuits.

According to my invention I propose to employ an independent winding for each rotating field and to locate the winding for producing the field having the maximum number of poles where the tendency to produce injurious local magnetic circuits is least, and to locate the winding for producing the field having the minimum number of poles where the tendency to produce injurious local magnetic circuits is greatest, and if more than two windings are employed to locate the intermediate winding or windings at intermediate points in accordance with the conditions specified.

Figure 1:
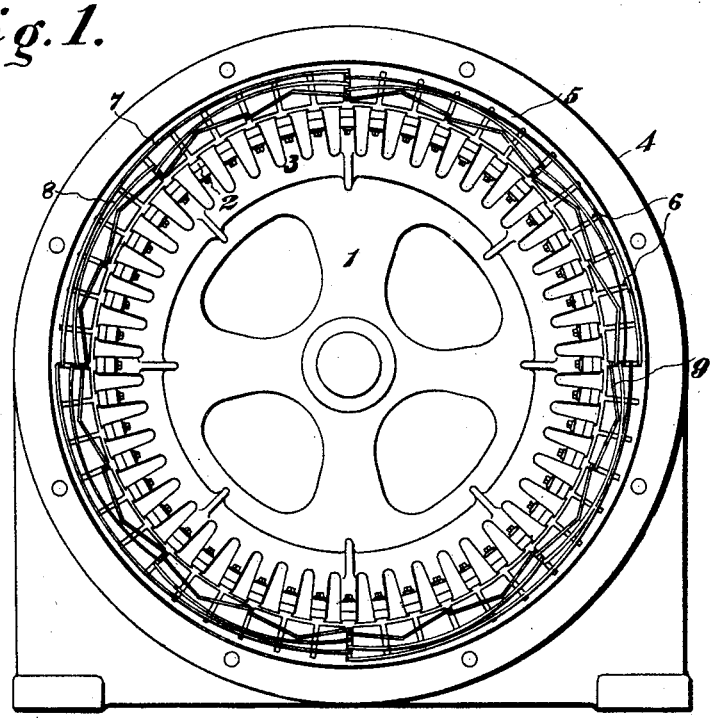
Figure 2:
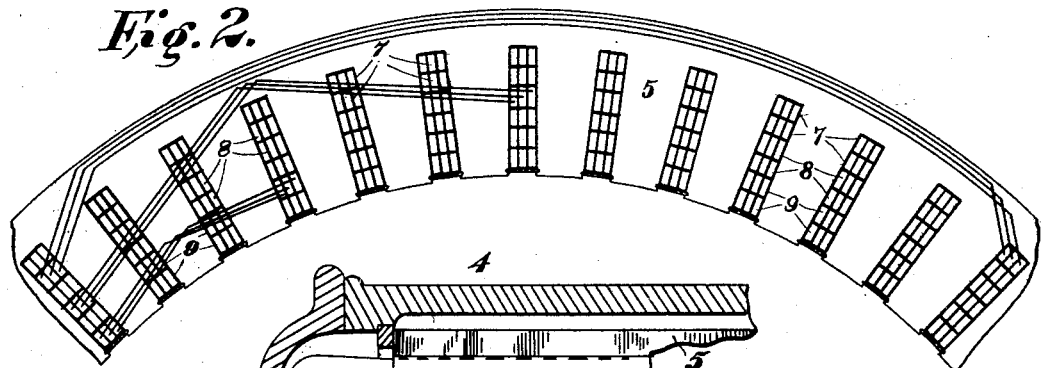
Figure 3:
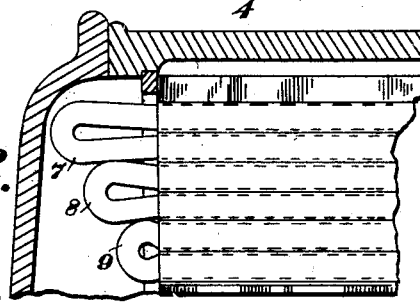

In the accompanying drawings, Figure 1 is an end elevation of a three-phase induction-motor, the primary windings being shown diagrammatically and only in part in order to avoid obscuring the relations and connections. Fig. 2 is a detail view of a portion of the primary member of the motor shown in Fig. 1, a portion only of the windings being here shown. Fig. 3 is a detail sectional view showing one set of the end connectors for the primary coils in elevation.

The secondary member 1 of the motor may be of any approved construction, it being here shown as comprising a core having longitudinal peripheral slots in which are located the conducting-bars 2, to the ends of which are bolted or otherwise fastened resistance-rings 3. The bars 2 and the rings 3 constitute electric circuits closed upon themselves, as is usual in this class of machines. The primary member 4 is provided with a laminated core 5, having comparatively deep and wide slots 6, in which are located three sets of windings 7, 8, and 9, each of these sets being subdivided into three sets of coils for the three phases of current employed in operating the motor.

The inner set of windings 7 is connected to form a three-phase four-pole winding, the intermediate set 8 is connected to form a three-phase eight-pole winding, and the set adjacent to the outer or open ends of the slots is connected to constitute a three-phase sixteen-pole winding. It is obvious that the sixteen-pole winding has a greater number of turns than the eight-pole winding and that the latter has a greater number of turns than the four-pole winding. Since the local magnetic circuits are poorest at the outer or open ends of the slots and best at the bottom or inner ends, this arrangement is such as to reduce the losses due to such local magnetic circuits to their smallest possible limits.

I have not deemed it necessary to show the working circuits leading to the primary windings or the switches for cutting the several windings into and out of circuit, since these are well known in the art and may be of any approved construction, it being understood that only one of the three-phase windings is employed at any one time.

The arrangement shown and described is such, as will be readily seen, that three different speeds may be secured by merely throwing ordinary switches to disconnect one set of windings and to connect another set providing a different number of magnetic poles.

The number of phases of current employed and the number of coils per slot, as well as the shape and size of slots and conductors, may obviously be varied within considerable limits without departing from the spirit and scope of my invention.

I claim as my invention—

1. In a polyphase electric motor, the combination with a secondary member having closed windings, of a primary member comprising a slotted core and a plurality of sets of coils corresponding in number to the sets of magnet-poles, the coils for producing the minimum number of poles being located at the inner ends or bases of the core-slots and those for producing the maximum number of poles being located adjacent to the outer or open ends of the slots, substantially as described.

2. In a polyphase electric motor, the combination with a secondary member having electric circuits closed upon themselves, of a primary member comprising a slotted core and a plurality of sets of coils for producing a corresponding number of rotating magnetic fields differing from each other as to the number of poles, the windings for producing the maximum number of poles being located nearest the surface of the core, substantially as described.

3. In a polyphase electric motor, the combination with a secondary member having electric circuits closed upon themselves, of a primary member comprising a slotted core, and a plurality of sets of windings located in the core-slots, those of each set being constructed and arranged to receive out-of-phase currents, but only one set being in use at any one time, the inner set being so disposed as to produce a minimum number of magnetic poles and the outer set being so disposed as to produce a maximum number of poles, substantially as described.

4. In a three-phase electric motor, the combination with a secondary member having electric circuits closed upon themselves, of a primary member comprising a slotted core and three sets of three-phase windings located in the core-slots, the set located in the bottom of the slots producing a rotating field having a minimum number of poles, the set located adjacent to the surface producing a field having a maximum number of poles, and the intermediate set producing a field having an intermediate number of poles, substantially as described.

In testimony whereof I have hereunto subscribed my name this 11th day of September, 1899.

BENJ. G. LAMME.

Witnesses:
WESLEY G. CARR,
H. C. TENER.